(12) United States Patent
Gardner (10) Patent No.: US 7,839,766 B1
(45) Date of Patent: Nov. 23, 2010

(54) METHOD AND SYSTEM FOR LONG HAUL OPTICAL TRANSPORT FOR APPLICATIONS SENSITIVE TO DATA FLOW INTERRUPTION

(75) Inventor: James A. Gardner, Holmdel, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1009 days.

(21) Appl. No.: 11/207,312

(22) Filed: Aug. 19, 2005

(51) Int. Cl.
*G01R 31/08* (2006.01)
*H04B 10/08* (2006.01)

(52) U.S. Cl. ............................. 370/218; 398/5; 398/7; 398/14; 398/34; 398/45

(58) Field of Classification Search ................ 370/238, 370/400–406, 216–218; 398/5, 7, 34, 45, 398/59, 79, 10, 14
See application file for complete search history.

(56) References Cited

U.S. PATENT DOCUMENTS

| | | | |
|---|---|---|---|
| 6,272,154 B1 * | 8/2001 | Bala et al. ................... | 370/535 |
| 6,850,707 B1 * | 2/2005 | Chang et al. ................. | 398/51 |
| 7,352,966 B2 * | 4/2008 | Chaudhuri et al. ............. | 398/5 |
| 7,356,258 B1 * | 4/2008 | Weverka et al. ............... | 398/59 |
| 2003/0041208 A1 * | 2/2003 | Volkmar ...................... | 710/316 |
| 2004/0161232 A1 * | 8/2004 | Kerfoot, III .................... | 398/5 |
| 2006/0126654 A1 * | 6/2006 | Nilakantan et al. .......... | 370/437 |

FOREIGN PATENT DOCUMENTS

WO    WO 02/11332 A2 *    2/2002

OTHER PUBLICATIONS

Generic Requirements for Optical Add-Drop Multiplexers (OADMs) and Optical Terminal Multiplexers (OTMs) (p. 77-83, Telcordia Technologies Generic Requirements GR-2979-CORE, Issue 4, Dec. 2001).*

* cited by examiner

*Primary Examiner*—Ian N Moore
*Assistant Examiner*—Matthew Hopkins (57) ABSTRACT

An optical network broadcasts the same data on a plurality of wavelength channels from a source network to destination network. The network elements of the optical network are configured so as to provide four diversely routed transmission pathways. At the receiving end, one of the plurality of wavelength channels is selected as the primary wavelength channel.

2 Claims, 7 Drawing Sheets

METHOD AND SYSTEM FOR LONG HAUL OPTICAL TRANSPORT FOR APPLICATIONS SENSITIVE TO DATA FLOW INTERRUPTION

FIELD OF THE INVENTION

The present invention relates to a method and system for enhancing network availability. Network failures within an optical network are protected against disruption by provisioning a multitude of alternate optical paths without need for protection switches.

BACKGROUND OF THE INVENTION

Businesses are becoming increasingly reliant on computer networks for mission critical applications. With the emergence of the Internet and the proliferation of global e-business applications, more and more organizations are implementing computing infrastructures specifically designed for reliably accessible data and system availability. Today, even applications such as e-mail have become critical for ongoing business operations.

Faced with increased customer and internal user expectations, organizations are currently striving to achieve the highest availability in their computing systems. Any downtime during mission critical applications can severely impact business operations and cost valuable time, money, and resources. To ensure the highest level of system uptime, organizations are implementing, for example, reliable storage area networks capable of boosting the availability of data for all the users and applications that need it. These organizations typically represent the industries that demand the highest levels of system and data availability, for example, the utilities and telecommunications sector, brokerages and financial service institutions, and a wide variety of service providers.

Developing highly available networks involves identifying specific availability requirements and predicting what potential failures might cause outages. In designing these networks, designers must first understand and define their availability objectives—which can vary widely from one organization to another and even within segments of the same organization. In some environments, no disruption can be tolerated while other environments might be only minimally affected by short outages. As a result, availability is relative to the needs of an application and a function of the frequency of outages (caused by unplanned failures or scheduled maintenance) and the time to recover from such outages.

One of the challenges of building an optical network is building in these availability objectives and characteristics, given the long spans of optical fiber used for example in long haul networks. Typically what is utilized is the construction of multiple diversely routed spans of optical fiber. Despite these redundancy measures, and monitoring techniques used, there is no escaping the reality that the frequency of switch to protect events increases with increasing transport distance.

Optical networks are mature robust transport mechanisms for general data applications. With careful attention to network architecture, optical protection switching mechanisms enable the construction of a network with no single point of failure.

However, these protection switches, though infrequent, involve a small, predictable but very real brief loss of data transmission continuity. In voice or general data applications this has been generally acceptable. In more recent data applications such as high speed optical networks used with mission-critical applications, these brief, infrequent protection switching events may bring about a halt in the application and possibly require lengthy data resynchronization activity before the application is restarted.

Although connectionless packet transport networks are less sensitive to brief interruptions in transport continuity due to sophisticated routing mechanisms, they remain a source for network failure. Connectionless transport can potentially have large, unavoidable variations in latency. These same applications that are sensitive to data transport continuity are also sensitive to latency variations.

In implementing these long haul high speed networks, network designers now consider network availability of primary importance over the costs associated with the implementation and operation of the network. For high volume networks, any downtime may mean the loss of millions of dollars. These availability concerns are now readily apparent in the type of performance levels required of service providers. Service Level Agreements (SLAs), having the "5 9s" (99.999%) level of performance, are now commonplace and a standard performance criteria. Under the "5 9s" level of performance, service providers are permitted no more than 5.25 minutes of downtime per year.

To achieve these very high levels of performance in a high speed network requires a combination of a low failure rate and, a very short recovery time whenever a failure occurs. For the most part, current protection and disaster recovery schemes make use of physical redundancy and an array of robust software-based recovery mechanisms. Physical redundancy has traditionally been achieved by provisioning redundant backup subsystems having substantially the same network elements as the primary network. In effect the primary networks are mirrored in the backup subsystem. In the event of a network failure, network elements such as switches and routers provide alternate and diverse routes on a real-time or predetermined basis. In tandem, software-based recovery schemes complement physical redundancy by minimizing the impact of interrupted customer traffic. Recovery software enhances network availability by automating the recovery process so as to ensure the fastest failover possible. At times, failover may occur so quickly that failovers appear transparent to the customer.

There are several high availability strategies in use today. Among these strategies are protective and restorative schemes based on centralized or distributed execution mechanisms, the priority of data, the network layer in which a failure occurs, link or node failures and real-time or pre-computed failure responses. In one protective strategy, backup resources are allocated on a one-for-one basis in advance of any network failure and regardless of the added expense or the inefficient use of available resources. In another protective strategy, available and previously unassigned resources are immediately allocated and used on a real-time or on a substantially real-time basis, at the expense of recovery speed.

Figure 1:
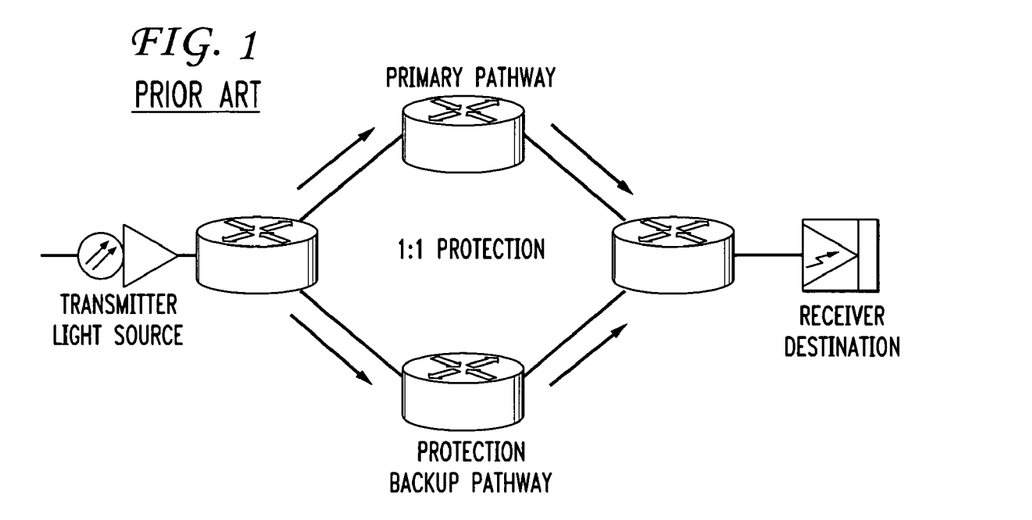
FIG. 1 is a 1:1 protective scheme found in the prior art.

Dedicated and shared use of network resources are two protective schemes currently used in network management. In the dedicated protective strategy, certain network resources are dedicated as backup network elements for use upon the failure of the primary communications channel. Backup resources such backup switches, routers, servers, controllers, interfaces, drives, and links are dedicated as backup to the primary network elements. In the early development of the networking industry, this strategy was referred to as a "hot standby" mode of operation. Upon the detection of a failure of a network element, its corresponding backup network elements were immediately placed in operation. As shown in FIG. 1, the primary network elements are substantially duplicated on the backup pathway. In the event of a failure, data being transmitted on the primary pathway is alternately routed through the backup pathway. In this protective approach to network availability, the backup pathway remains idle, but is immediately made available to data on the primary pathway. As readily apparent, the provisioning of a fully redundant and diverse route adds considerable expense to the installation and operation of the high speed network. Moreover the physical switching of pathways may result in a disruption long enough to bring down a system.

Figure 2:
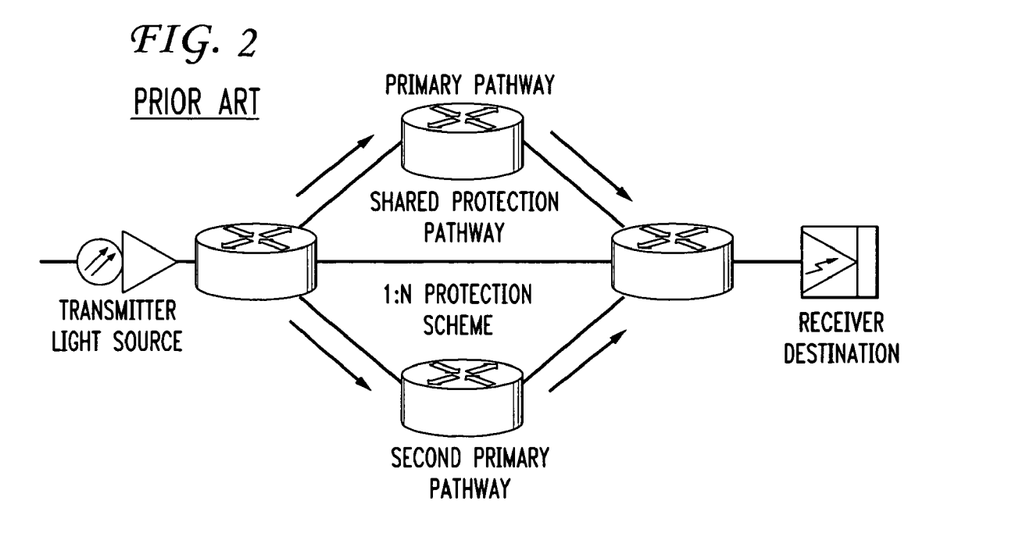
FIG. 2 is a 1:N protective scheme found in the prior art.

To minimize the costs associated with a dedicated protective strategy, a shared approach as shown in FIG. 2, utilizes a backup pathway which is shared by several other primary pathways in the event of a network failure. In this shared protective scheme, one single pathway provides backup transport for each of the primary pathways. This shared protective scheme is known as a 1:N configuration, where N is the number of primary pathways to share the backup pathway. Shared protective configurations operate under the presumption that only one of the primary pathways may fail at any given time. This presumption, however can only be justified statistically in circumstances where the primary pathways are diversely routed and the occurrence of a failure event at any point on the network is unlikely to cause a failure in a span or node served by the same backup pathway. These same protective strategies have been applied to newly developed high speed networks.

In the optical networking industry, storage area networks (SANs) have used these same protective strategies, with less than acceptable availability performance. A SAN is a network whose primary purpose is the transfer of data between and among computer systems and storage elements. A SAN consists of a communication infrastructure, which provides physical connections, and a management layer, which organizes the connections, storage elements, and computer systems so that data transfer is secure and data is highly available. A major advantage of SANs is the ability to provide any-to-any connectivity between the storage devices and remote computers. This means that multiple computer systems can share a storage device so as to allow for the consolidation of storage devices into one or a few centrally managed platforms. SANs employ Fibre Channel technology to provide 100 mbs or better data transfer speeds which is significantly faster than today's SCSI. At these speeds, SANs are used to perform backup and recovery functions, such as data replication, clustering, and mirroring. However these functions are quite sensitive to data disruption and may also be susceptible to the briefest of network failures.

To ensure that the functional advantages inherent in storage area networks and the like are realized, there is a need for a method and system of transport which is more than highly available or fault-tolerant. The present invention fulfills this need and obviates the deficiencies found in current availability schemes by providing a means of provisioning a continuously available transport network. With the present invention, there is no single point of failure. Only a simultaneous loss of an optical link or equipment in each of the diversely routed pathways would result in total network failure. If however the maximum span length is restrained to that required by the expected level of network availability, this is statistically unlikely. There will not be any network element level failure or fiber cut switch to protection. It is not necessary to provide card level protection in this architecture, hence there will be no card switch to protect either. More specifically, there will be no optical layer protection switches from any source. The optical layer protection stems from the multiple fixed pathways through the optical network.

SUMMARY OF THE INVENTION

The present invention is intended to provide a method and system by which a high level of network availability is provided to an optical network. These objectives are achieved by employing the use of optical network elements to allow the substantially simultaneous broadcast of data through a plurality of diverse network paths and network elements. The system utilizes network elements to conduct the following steps: assigning four (4) wavelength channels to each data channel; broadcasting the same data on each of the four (4) wavelength channels; routing a first pair of the four (4) wavelength channels through a first main span of the optical network and a second pair of the four (4) wavelength channels through a second main span of the optical network; transversely connecting the first main span to the second main span with a transverse optical link; and routing one of the wavelength channels in the first pair and one of the wavelength channels in the second pair through the transverse optical link towards the destination network.

BRIEF DESCRIPTION OF THE DRAWINGS

A wide variety of potential embodiments will be more readily understood through the following detailed description, with reference to the accompanying drawings in which.

DETAILED DESCRIPTION OF THE INVENTION

Figure 3:
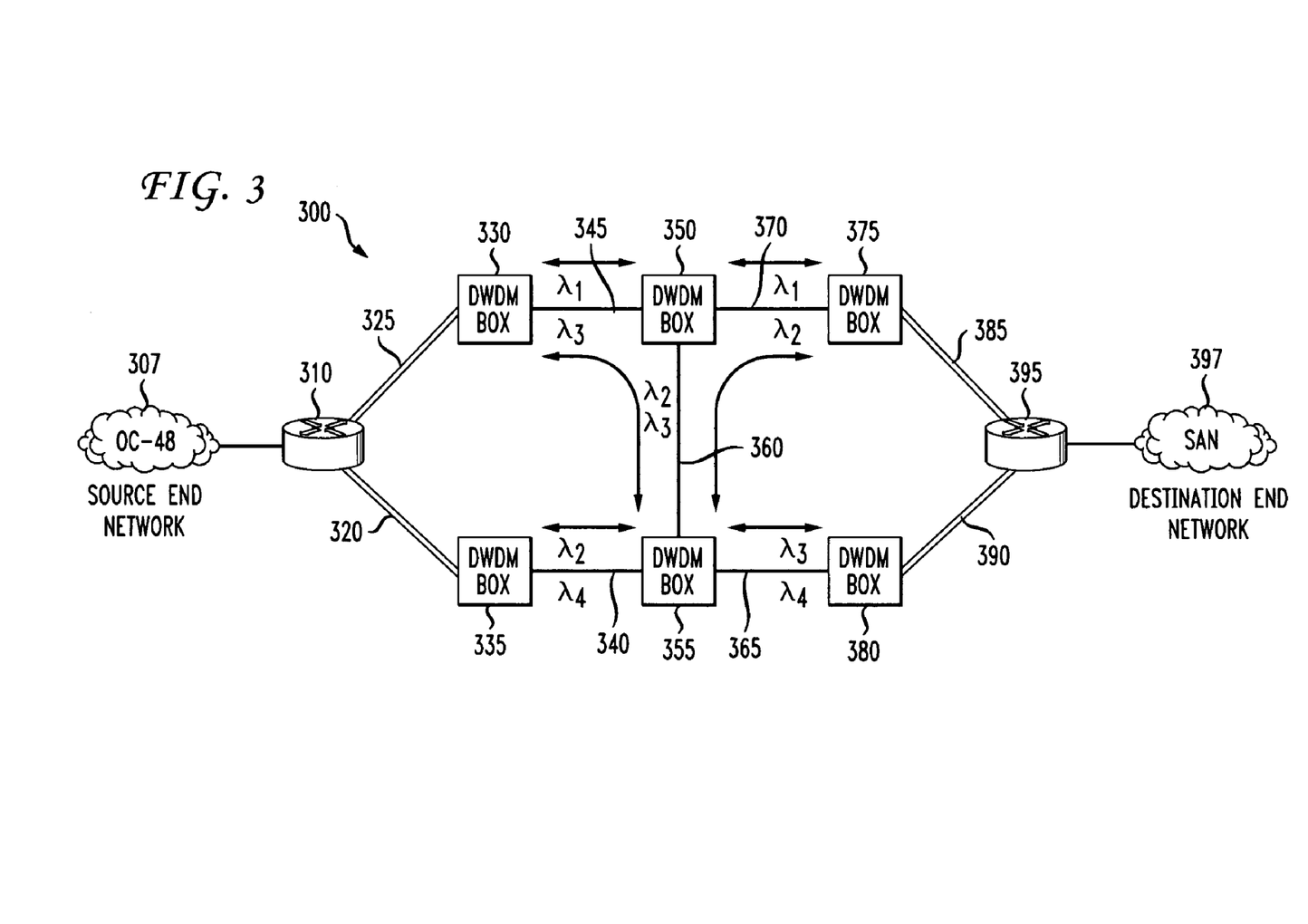
FIG. 3 is a first embodiment of the invention in a long haul optical network.

Shown in FIG. 3 is an optical network 300 functioning as a high speed transport of data from an optical source end network 307 (for example an OC-48) source to a destination end network 397 (for example a San) and using at least two (2) diversely routed DWDM (Dense Wavelength Division Multiplex(ed)(er)) circuits with end and intermediate DWDM equipment boxes 330, 335, 375, 380 350, 355 spaced within the route mileage that corresponds to an expected level of network availability. These intermediate DWDM boxes 350, 355 are connected with optical fiber 360 transverse to the two (2) main optical spans (links 345, 370 and 340, 365). Switch 310 receives and transmits data from various source side network elements preferably in optical form. If necessary electrical data may be optically converted in switch 310. Also the switch may have other on board electrical signals. Switch 310 may take the form of a router, Ethernet switch, or SAN (Storage Area Network) switch or any other network element capable of providing optical input data to any of the end DWDM (Dense Wave Division Multiplexing) boxes 330, 335. Also DWDM network elements may have other on board electrical signals (e.g. SAN transport protocols) with the use of an appropriate plug in card. Preferably however and for illustration purposes, both switches 310, 395 are optical and connect to their respective optical and network links. Switches 310, 395 may depending on their function and on the requirements of the connecting network, comprise, a programmable processor/controller, memory storage, cross-connect, wavelength converter, processing software including arbitration and event correlation modules and a variety of interface modules for communicatively connecting switches 310, 395 to the optical network and their respective source or destination networks.

When the optical network 300 is configured, switches 310, 395 will auto discover (or be provisioned with) four (4) diversely routed pathways end-to-end. In the event of a fiber section cut or an equipment node failure, the receiving switch 395 or an intermediate controller such as those shown in FIGS. 7, 8, and 9, will choose one of the other three (3) alternate pathways and handle the flow control management to the destination end network 397.

While there may be variations in the latency of the multiple optical paths, the variation is known, discrete (only four values) and bounded, as opposed to a connectionless network whose latency is statistical. If the latency variations are known, discrete and bounded, the applications may be tuned to accommodate in most cases, an exception being synchronous mirroring applications running near its transport timeout limits. In some isolated cases, depending upon equipment locations and available fiber routes, latency variations between the pathways may be minimized with careful planning.

Switches 310 and 395 have a plurality of wavelengths (λs) for use as communication data channels on the optical network 300. Each of these data channels is dynamically designated with at least four (4) wavelengths (λs). Although the invention is operationally described in one transport direction, it should be understood that the network may be operated in either unidirectional or bidirectional mode. Switch 310 receives data from the source end network 307 and broadcasts the same data on all four wavelengths ($\lambda_1,\lambda_2,\lambda_3,\lambda_4$) at the same time or substantially at the same time. Two wavelength channels ($\lambda_1$, $\lambda_3$) link 325 are transmitted to end DWDM box 330, while the other two wavelength channels ($\lambda_2,\lambda_4$) on link 320 in the data channel are sent to end DWDM box 335. Intermediate DWDM boxes 350, 355 are not only connected to end network DWDM boxes 330, 375, 335 and 380, but rather are also connected to each other. As applied herein, a DWDM box is an optical processing device responsible for receiving and/or transmitting or otherwise processing optical signals.

As shown in FIG. 3, link 360 connects intermediate DWDM box 350, to DWDM box 355 and serves to bridge two (2) diversely routed main spans comprising links 345, 370 and links 340, 365 as well as providing two (2) additional transverse pathways between source and destination end networks 307, 397.

In operation, destination optical switch 395 selects only one of the four (4) wavelength channels in the assigned data channel, at any given time, as the primary pathway (primary channel) for receiving and forwarding data to the destination end network 397. Preferably, switch 395 (or a controller) receives, stores and buffers received data from all four (4) wavelength channels but only forwards data received on the primary wavelength channel. In the event of a network failure, receiving switch 395 (or a controller) selects another wavelength channel within the assigned data channel through an arbitration process.

Selection of the wavelength channel requires the use of a means for separating light into its various wavelengths. In the present invention, there are a myriad of technologies which could be used to select and process a selected wavelength, including but not limited to various forms of demultiplexing and optical filtering. Because DWDM transport systems send signals from several sources over a single fiber, the DWDM boxes generally include optical multiplexers and demultiplexers for combining and separating the transported signals and operating in a unidirectional or bidirectional mode.

Moreover, these optical multiplexers and demultiplexers (mux/demux) can either be passive or active in design. Passive designs are primarily based on prisms, diffraction gratings, and filters while active designs combine passive devices with tunable filters and other electronics. In the active design, these mux/demux devices may include a programmable processor, short and long term memory, processing software and various optical and electric signal interfaces for programming and controlling data flow.

Currently, there are several optical multiplexing technologies used in DWDM systems such as thin-film filters, arrayed waveguide grating (AWG), Bragg grating, interleavers, periodic filters and frequency slicers. All these technologies may be used alone or in combination in order to process optical signals.

In one embodiment of the present invention, wavelength separation is achieved by using thin-film filters (TTFs). TFFs are devices that use ultra-thin layers of dielectric material coating deposited on a glass or polymer substrate. When manufactured, the substrates are made so as to allow only photons of a predetermined wavelength through while rejecting or reflecting all others. In operation, several of these TFFs are cascaded together to allow a plurality of wavelengths to pass through. Photons of various wavelengths are received and when the photons encounter the first TFF, only one designated wavelength is allowed through, the rest of the received wavelengths are reflected to the other cascaded TFFs where again the same selection and rejection process is repeated to further isolate and process the transporting wavelengths.

Alternatively, the present invention may utilize Bragg grating and the like to process optical signals. Bragg grating uses a piece of fiber that has been exposed to ultraviolet radiation in order to create step changes in the refractive index along the fiber. When light travels though the Bragg grating, light is refracted and selected wavelengths are reflected back and captured individually.

In yet another embodiment, the present invention utilizes arrayed wavelength guides to separate the optical signals. The various wavelengths experience maximal interference at different locations along the waveguide resulting in the separation of wavelengths. Arrayed wavelength guides utilize array curved-channel waveguides with a fixed difference in the path length between adjacent channels. Multi-wavelength light enters at an input cavity where it is diffracted before it is passed on to the waveguide array. The difference in optical path length of each waveguide introduces phase delays at an output cavity where an array of optical fibers collect the individual wavelengths.

Alternate and diverse routes are created by the selection and exclusion of certain wavelengths on fiber links between DWDM boxes. As shall be disclosed in more detail, the present invention utilizes two (2) diversely routed fiber spans between the source switch 310 and the destination switch 395 to provide four (4) diverse optical pathways of transmission.

Switch 310 forwards a pair of wavelengths to each of the end DWDM boxes 330, 335 on links 325, 320 respectively. Within each of the end DWDM boxes 330, 335, the corresponding pair of wavelengths are wavelength division multiplexed onto a single fiber. The fiber link 345 transports both wavelengths ($\lambda_1$, $\lambda_3$) to intermediate DWDM box 350 while fiber link 340 transports wavelengths ($\lambda_2$, $\lambda_4$) to intermediate DWDM box 355. DWDM boxes 350, 355 preferably incorporate the use of an add/drop multiplexer ("OADM") to selectively route certain wavelengths to various output optical links or ports. For example, in intermediate DWDM box 350, an OADM accepts the multiplexed optical signal on link 345 from the end DWDM box 330 and selectively routes $\lambda_1$ to link 370 (an onto link 385) and routes $\lambda_3$ to link 360 (and onto lines 365 and 390).

Figure 4:
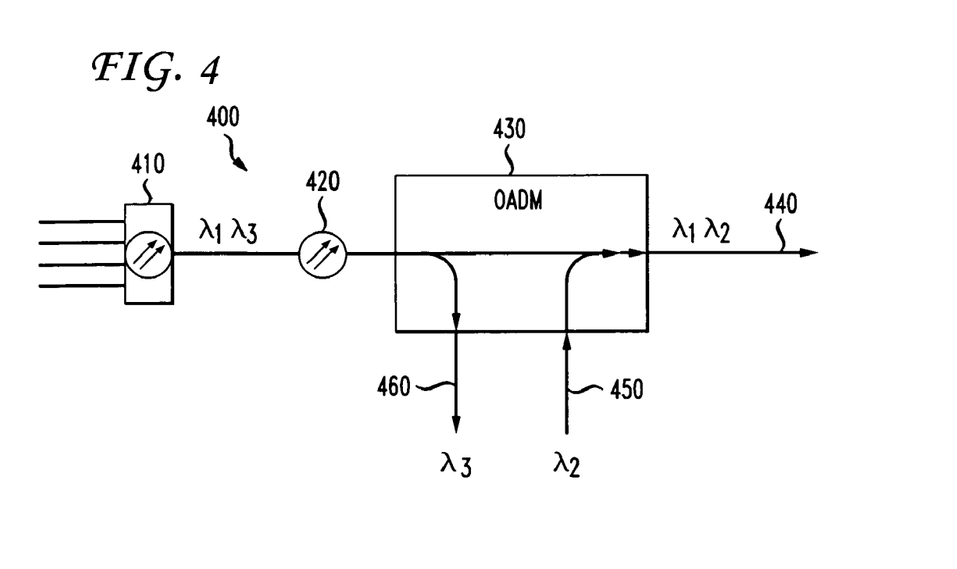
FIG. 4 is a representation of data flow in an OADM.

The routing of these wavelengths in an OADM is shown in FIG. 4. From the multiplexed output of end DWDM box 410, the composite optical signal (containing ($\lambda_1$, $\lambda_3$) travels across the optical link 420 to an OADM 430 in intermediate DWDM box 350. Through one of the various technologies referenced above, such as TFF, $\lambda_3$ is reflected and dropped from the composite optical signal (containing $\lambda_1$) and added onto optical link 460 with $\lambda_2$. The composite optical signal (containing $\lambda_1$) is allowed to pass through and is multiplexed onto link 440 with $\lambda_2$. This process is preferably done without the need for converting the optical signal into an electrical signal or the need for the separation of all wavelengths. Rather, the OADM allows certain wavelengths through and selectively drops and adds selected wavelengths. It should noted than in some OADM processing schemes, conversion to an electrical signal does occur with the added step of converting the signal back into optical form and multiplexing all wavelengths onto a single fiber.

Although several technologies may be used to accomplish this add/drop function, thin-film filters have emerged as the technology of choice for OADM applications in a DWDM system primarily because of their low cost and stability. In the future, it is anticipated that as costs drop, fiber gratings and circulators may become more widespread and used to accomplish the add/drop function.

Operationally, OADMs may be made in static or dynamic form. In a static form of an OADM, the physical configuration or optical patchwork is fixed. Predetermined drops and additions of certain wavelengths are fixedly manufactured in the static OADM devices (fixed reflection and transmission due to sequenced optical filters). In the dynamic form of an OADM, the device is reconfigurable and capable of dynamically selecting which wavelength is dropped or added. Preferably, the present invention includes a static form of an OADM primarily because of its simplicity and passive nature which lends itself to a higher level of network availability.

Figure 5:
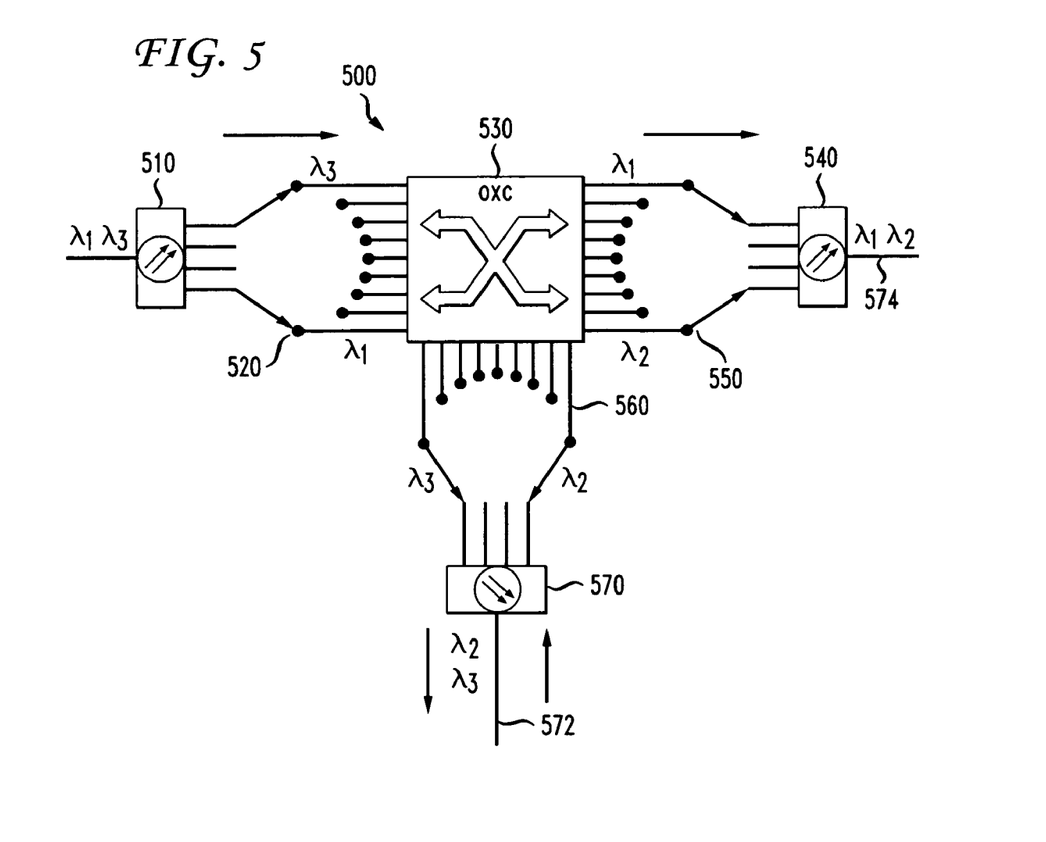
FIG. 5 is a representation of data flow in an OXC.

FIG. 5 shows an alternative to the OADM. An optical cross connect ("OXC") is used to route predetermined wavelengths from an input port to a selected output port. As applicable to the optical network shown in FIG. 3, an optical signal containing $\lambda_1$, $\lambda_3$ is received by intermediate DWDM box 350 having an OXC 530. The demultiplexer 510 in the OXC 530 separates the optical signal into various wavelengths at output 520. As shown, the output of the demultiplexer, $\lambda_1$, $\lambda_3$ is routed through the cross connect in OXC 530 to the preselected output ports of the OXC, 550, 560. Routed outputs are sent to DWDM multiplexers 540, 570, responsible for combining the various wavelengths onto a single fiber. In FIG. 5, the outputs of the DWD multiplexer combine $\lambda_1$, $\lambda_2$ onto the optical link 574 and $\lambda_2$, $\lambda_4$ onto optical link 572.

In the present embodiment of the invention, the use of an OADM 430 is preferable over the OXC 530. As readily apparent, the OXC 530 requires additional processing not found in the OADM 430. In the OXC 530, the optical signal must be demultiplexed, sent to the OXC 530 and then multiplexed onto the corresponding optical links. In the OADM 430 however, the selected wavelength is removed while the remaining wavelengths within the composite optical signal are transmitted to the corresponding output port. If required one or more wavelengths may be added (multiplexed) onto the output optical signal.

Between source and destination switches 310, 395, there are four (4) diverse pathways of travel for each of the wavelengths in the data channel. As is readily apparent from FIG. 3, a first transmission path allows data on $\lambda_1$ to travel on fiber links 325, 345, 370 and 385 and DWDM boxes 330,350, 375; a second transmission path allows data on $\lambda_2$ to travel on fiber links, 320, 340, 360, 365, 385 and DWDM boxes 335, 355, 350, 375; a third transmission path allows data on $\lambda_3$ to travel on fiber links 325, 345, 360,365,390 and DWDM boxes, 330, 350, 355, 380; and a fourth transmission path allows data on $\lambda_4$ to travel on fiber links, 320, 340, 365, 390 and DWDM boxes 335, 355, 380. It should be understood that additional routes through the transverse link 360 and associated intermediate DWDM boxes 350, 355 allows for the four (4) diverse routes for the four (4) wavelength channels.

Figure 6:
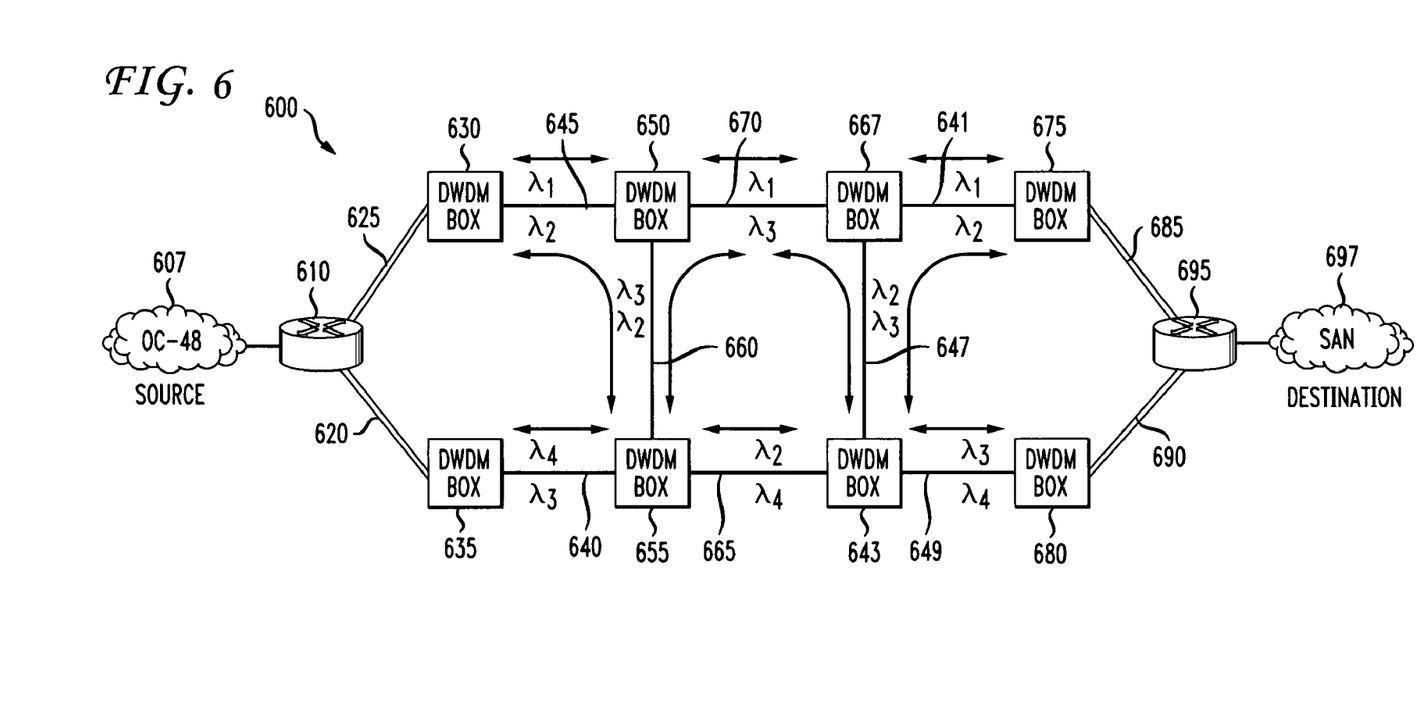
FIG. 6 is another embodiment of the invention in a long haul optical network.

In another embodiment of the present invention as shown in FIG. 6, four (4) intermediate DWDM boxes 650,655, 667, 643 and two (2) transverse links 660, 647 are used to provide four (4) diversely routed pathways of transmission. A source end network 607 provides switch 610 with a stream of high speed data. The data channel is assigned four (4) wavelengths ($\lambda_1$,$\lambda_2$,$\lambda_3$,$\lambda_4$) which carry the same data sent to switch 607. The duplicated data in these four (4) wavelength channels is simultaneously broadcasted throughout the optical network 600 at substantially the same time. Wavelength channels $\lambda_1$,$\lambda_2$ are routed through link 625, while wavelength channels $\lambda_3$,$\lambda_4$ are routed through link 620. As was the case with optical network 300, four (4) diversely routed pathways are created by using the transverse links 660, 647 and selectively designating the wavelength channels which are passed through or diverted at each of the intermediate DWDM boxes 650, 655, 667, 643. As shown in FIG. 6, optical network 600 has a first transmission pathway which crosses links 625, 645, 670, 641, 685 and end and intermediate DWDM boxes 630, 650, 667, 675; a second transmission pathway which crosses links 625, 645, 660, 665, 647, 641, 685 and end and intermediate DWDM boxes 630, 650, 655, 643, 667, 675; a third transmission pathway which crosses links 620, 640, 660,670, 647, 649, 690 and end and intermediate boxes 635, 655, 650, 667 643, 680; and a fourth transmission pathway which crosses links 620, 640, 665, 649, 695, and end and intermediate DWDM boxes 635,655, 643, 649. These wavelength channels are received by destination switch 695 for forwarding to destination end network 697. As is readily apparent, the present invention may utilize one or more transverse links and corresponding pair of intermediate DWDM boxes as needed.

Because the four (4) diverse pathways are each comprised of different combinations of fiber links and DWDM related equipment, each of the four (4) wavelengths will experience different transmission effects. For example, each wavelength within each of the data channel may experience, different latencies, attenuation, and distortion. When a failover occurs, the receiving switch 395, 695 or a controller will select the next best available wavelength channel in a substantially transparent manner. The switchover is transparent or almost transparent to the destination end network.

Selecting the best available wavelength may be based on a variety of factors, such as the length of the route, the number of intermediate network elements, transmission delay or any other high availability consideration. In one aspect of the present invention, the process of selecting a primary wavelength channel is dependent on an arbitration process. Because the present invention utilizes a plurality of wavelengths per data channel for broadcasting the same data over diverse routes at substantially the same time, there are a plurality of access requests within the same data channel at any given time.

Figure 7:
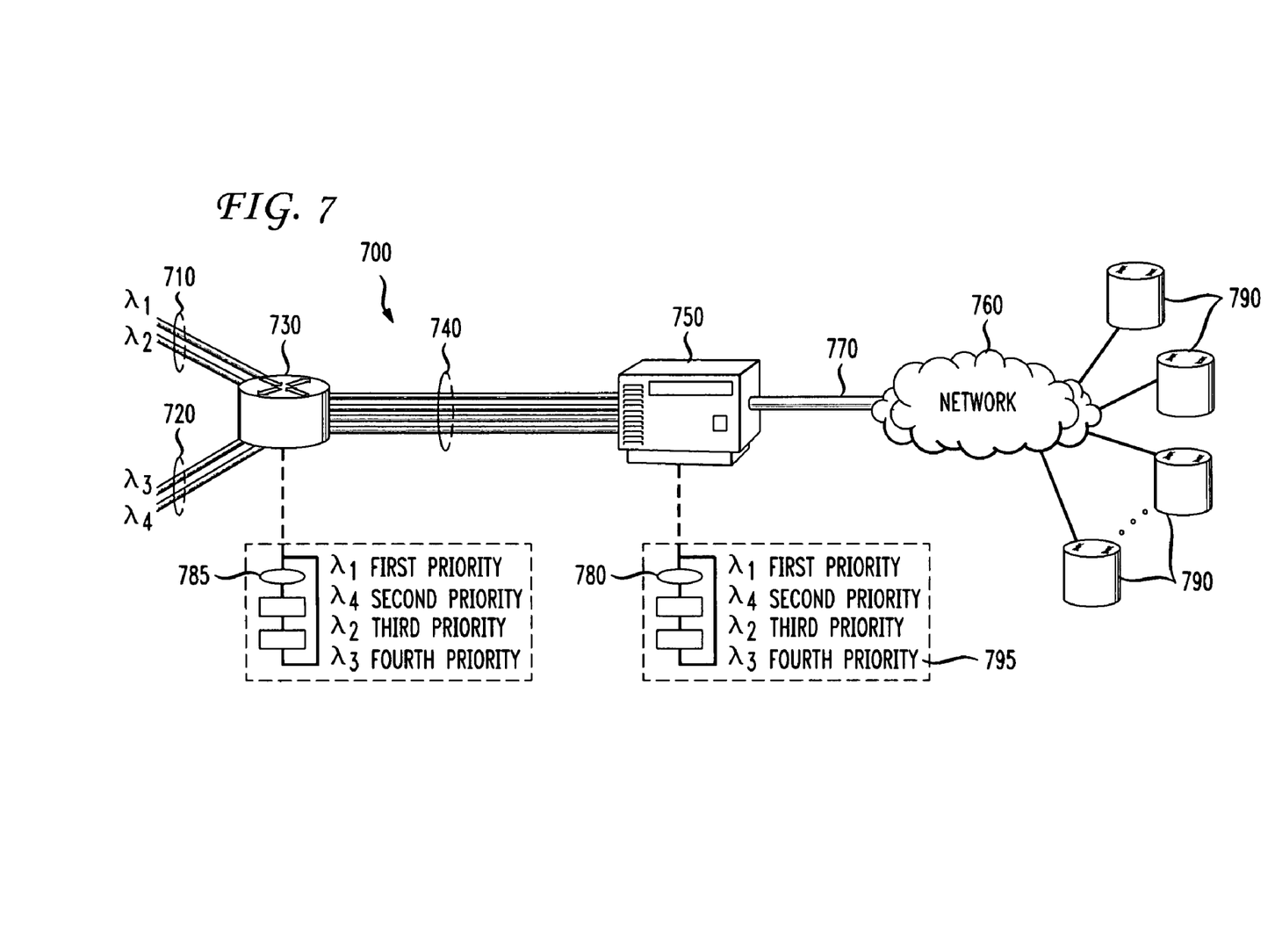
FIG. 7 shows a SAN controller in control of the data flow between an end switch and a storage area network.

During set up of the network, the switches auto discover or are provisioned with four (4) distinct and diversely routed paths. Moreover, and although four wavelength channels with substantially the same data are received, one channel is chosen. Shown in FIG. 7 are the receiving end switch 730, a controller (e.g. server) 750, the storage area network 760 and associated storage devices 790. In one embodiment of the present invention, only one (1) of the four (4) data streams is used in an application 780 and in processing data onto storage devices 790. The selection of the one (1) data stream is performed in either an arbitration process conducted in the receiving switch 730 or in a correlation process carried out by an application in the controller 750.

In the arbitration process conducted at end switch 730, all four (4) wavelength channels are received by the receiving switch 730. Based on certain decision factors, including but not limited to, data latency, error rate, assigned priority in the data carried by each of the wavelength channels (separate data streams) or any other arbitration criteria, a program executable 785 at the end switch 730 selects one and only one primary wavelength channel which will be sent to the controller 750 for use in a resident application 780. The other three (3) wavelength channels are discarded.

Alternatively, all four (4) of the wavelength channels are received by end switch 730 and are separated into individual data streams 740 which are transferred and made available to the controller 750. As shown in FIG. 7, there are four (4) data streams sent to the controller 750 each containing substantially the same data. These four (4) data streams are selected by an application 780 executable at the controller 750. The data stream to be used in application 780, is selected by correlating the data in the received data streams. More specifically, the controller 750, for example, correlates or compares two or more of the data streams to determine whether they are the same. If they are the same, the controller selects one of the data streams for use in the application. If there are discrepancies between the data streams, the application interacts with the sending process to resolve the discrepancies (i.e. not at transport layer). In some cases, the solution may be to require a retransmission.

In another embodiment and as shown in FIG. 7, the four (4) wavelength channels of the previous embodiment(s) are received on links 710, 720 and are processed by the destination switch 730. The same data on each of the four (4) wavelength channels on links 710, 720, are forwarded to a controller 750 responsible for controlling the flow of data through connection 770 into a SAN 760 (destination end network). The data packets from each of the wavelength channels are buffered in the destination switch 730. Switch 730 interfaces with controller 750, and generates a plurality of requests for the transmission of data as the primary wavelength channel. Based on an arbitration algorithm comprising for example a priority ranking 795, in an application 780 in controller 750, transmission of data is denied or granted.

Figure 8:
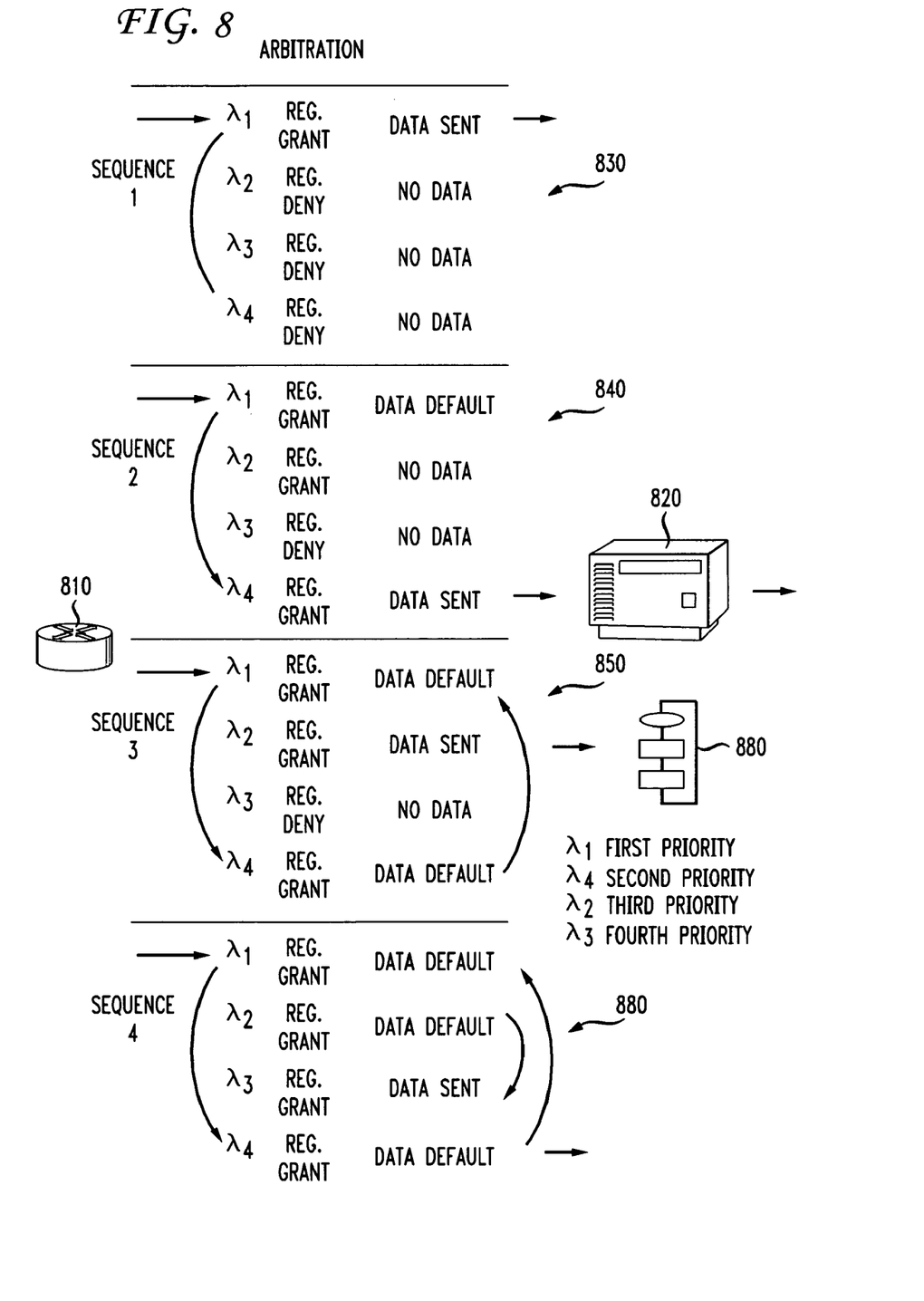
FIG. 8 is a representation of an arbitration sequence.

In FIG. 8, there are four (4) contention sequences which illustrate the arbitration process. Unlike data channel arbitration, the arbitration for selecting the primary wavelength channel is a matter of selecting the best means available for receiving the same data from the set of four (4) wavelength channels. For example, the wavelength channel selected may be based on the transmission quality and the characteristics of the data received and may be designated by an assigned priority ranking.

For illustration purposes, wavelength channels $\lambda_1, \lambda_2, \lambda_3$, and $\lambda_4$ are designated as having priority levels 1, 3, 4 and 2 respectively. In the first sequence 830 of the contention process as shown in FIG. 8, all wavelength channels request access—however, wavelength channel 1 (having the highest priority) is the only channel granted access and designated as the primary channel. In each sequence the switch 810 initiates an access request. The controller 820, based on its interface software will grant or deny access.

In the event that the current primary wavelength channel is no longer functioning as desired, perhaps due to equipment or link failure, errors in transmission or unduly long latencies, the next wavelength channel having the next highest priority is selected. In the second sequence 840, all remaining channels once again request access. Acknowledging the next highest ranking, controller 810 through its interface software having arbitration module 880, may then switch over to wavelength channel 4 which has a priority 2 ranking. It should be noted that a priority ranking of 1 and 2 for wavelength channels 1 and 4, respectively is expected, since wavelength channels 1 and 4 travel in a pathway having the least amount of optical fiber and the least number of network equipment—in effect wavelength channels 1 and 4 have a more direct route to its destination, with the least amount of expected latency and distortion.

In the third sequence 850, and assuming that wavelength channels 1 and 4 are no longer available, the next ranked wavelength channel, channel 2 is selected (granted access). Ultimately, in the fourth sequence 880, wavelength channel 3 is granted access. Notably, the change from one primary wavelength channel to another is a seamless processing step which is transparent to the receiver. As part of the interface protocol between the switch 810 and the controller 820, the dynamic selection of the primary wavelength channel is a transmission and processing occurrence which signifies neither a network failure nor transmission error, but rather renders the optical network continuously available. Any delay in processing (if any) is part of the processing protocol and viewed by the destination end network as a processing occurrence and not the occurrence of a failure.

In this illustration, there was an assumption that during the selection of wavelength channels, previous primary channels were no longer available for transmission. The operational reality is that the ranking of wavelength channels is a dynamic process which may be conducted at any time resulting in a new prioritization. For example, in the second sequence 840, wavelength channel 4 may not have maintained its priority 2 ranking—instead wavelength channel 2 may have attained that designation and would have been the next designated primary pathway of transmission. In this rather simplified example, priority ranking was the key determinant in the arbitration process. However, other high availability factors and certain aspects encompassed in event correlation may have changed the sequence availability of the wavelength channels. Moreover, it should be understood that the arbitration process may have occurred at the receiving switch 810 as well as in the controller 820. Wavelength channel data could have been buffered at the receiving switch 730. The receiving switch 810 could have executed its own arbitration algorithm and only the data selected from the primary wavelength channel would have been transferred to the controller 820.

In one aspect of the present invention, event correlation is also used to enhance high network availability. As used herein, event correlation is the process of monitoring what is happening on a network and on related systems in order to identify patterns of events that might signify network failure, redundant data, attacks, intrusions, or misuse. It is an automated process that enables administrators to find, among many events, those revealing patterns of data which may have an adverse effect on the security, performance and availability of the network. Of particular concern in designing a high availability network is the efficient use of wavelength channels and of the number of assigned wavelengths to a transmission event.

As applicable to the present invention, the use of the four (4) wavelengths to establish four (4) diversely routed pathways may not be the most efficient means of data transmission. In order to minimize network congestion, event correlation may be used to recognize patterns in the received data and to discard the use, for example, of one or more of the three (3) backup wavelength channels. The decision to drop a wavelength channel may be based on a variety of well known correlation techniques. State transition graphs (finite state machines), rule-based reasoning, statistical, binary coding (codebooks), case-based reasoning, probabilistic dependency graphs (Bayesian networks, belief networks), model-based reasoning, and neural networks, are just a few of the know correlation techniques used alone or in combination.

Figure 9:
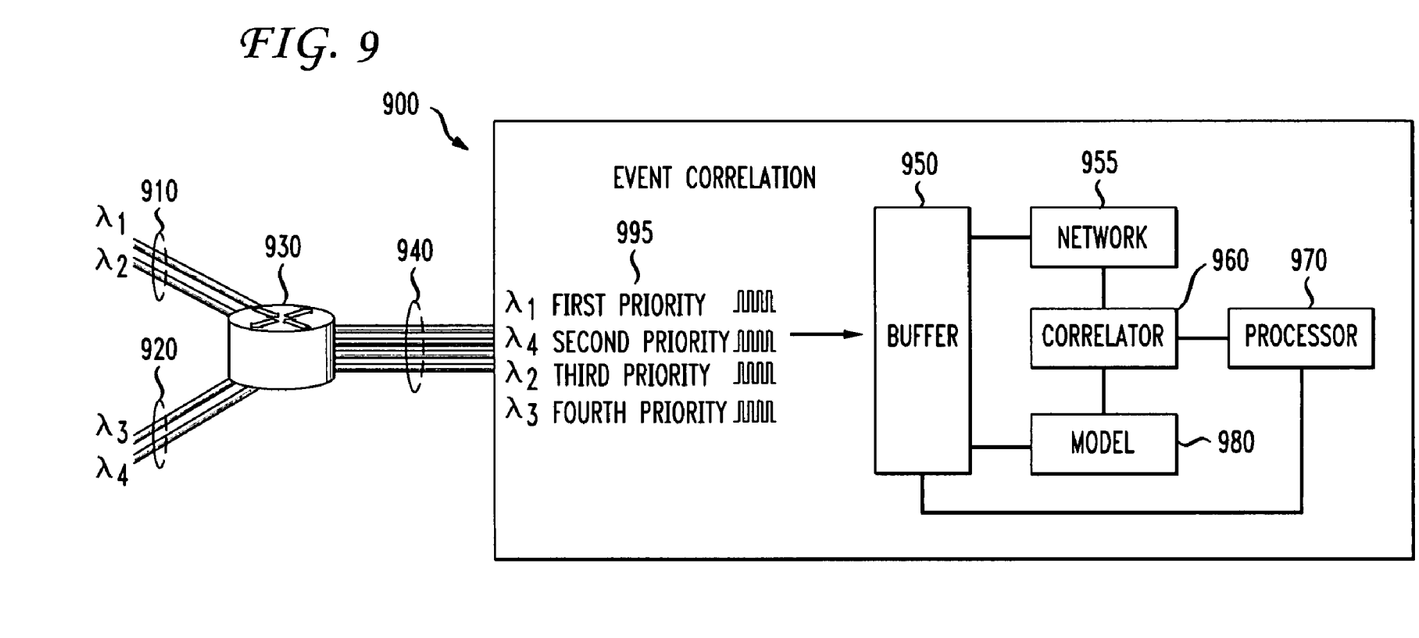
FIG. 9 is a representation of an event correlation process.

Shown in FIG. 9 is a broad conceptual depiction of event correlation as applicable to one embodiment of the present invention. For purposes of illustration, a controller 900 between the receiving switch 930 and the SAN 975 is used to conduct an event correlation process in the management of the data flow. It should be understood however, that the correlation process could also have been done by the receiving switch 930 or any other processing network element. Data blocks transported through the four (4) optically diverse pathways are received at receiving switch 930 via links 910, 920 and passed onto controller 900. Data from the receiving switch 930 is preferably buffered in buffer memory 950. Correlation software generally comprising a monitoring module 955, a correlation model module 980 and correlation engine or correlator 960 is used to detect known data patterns and events and to take corrective action. As data blocks are buffered in buffer memory 950, the monitoring module 955 analyzes the received blocks of data. Information relating to the type of data, its priority, size, origin, transmission delay, wavelength of transmission, optical signal-to-noise ratio as well any other relevant information available which may affect the quality of transmission or describe the characteristics of the data blocks is ascertained. The monitoring module 955 categorizes the type of data received, for example by levels of priority 995, and then forwards this information to the correlator 960. The correlator 960 processes the data and uses it to detect patterns based on information and processes conducted by the correlation model 980. If for example, the correlation model 980 has a set of rule-based transmission algorithms and a statistical model for predicting the type, length, or priority of the data to be received in the next transmission of data, the correlator can under certain circumstances disconnect/drop one or more of the established pathways since such data may be redundant. For example, in the event that transmission from the source switch has over a statistically significant period of time, been error-free, and the probability of having a failure is extremely insignificant, and the rule-based transmission model, advocates the dropping of the pathway with the most latency and lowest priority, the correlator 960 may drop the transverse pathway provisioned by wavelength $\lambda_3$. Under these set of circumstances, discarding the least desirable pathway makes sense, since the use of three (3) pathways will not statistically and significantly enhance the availability of the network. Moreover, the discarded wavelength would then be available for inclusion in another data channel comprising four (4) wavelengths.

The above embodiments of the invention were described in the context of a data channel having four wavelength channels and an optical network suitable for using in a long haul optical network. In addition to these embodiments, it should be understood, that the invention may also use several data channels in unidirectional and bidirectional mode, with data channels having a plurality of wavelength channels assigned to each data channel, and network elements configured to create a plurality of diversely routed transmission pathways.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein.

What is claimed is:

1. A method of transporting data from a source network to a destination network through an optical network over four diverse pathways comprising:

assigning four wavelength channels to transport the same data;

broadcasting the same data on each of the four wavelength channels simultaneously;

routing two of the four wavelength channels through a first main span of the optical network and the remaining two wavelength channels through a second main span of the optical network;

interrupting the first main span with one or more intermediate box and interrupting the second main span with a number of intermediate boxes corresponding to the number of first main span intermediate boxes forming corresponding pairs of intermediate boxes between the first and second main spans;

connecting corresponding pairs of intermediate boxes with a transverse link;

exchanging one of the two wavelength channels in the first main span with one of the two wavelength channels in the second main span through each transverse link progressing towards the destination network;

receiving the four wavelength channels at the destination network;

analyzing the data received in each of the four wavelength channels;

detecting information of known data patterns and events;

correlating the known data patterns and events using a correlation model, wherein the data pattern and event information comprises type of data, priority, size, origin, transmission delay, transmission wavelength and optical signal-to-noise ratio (OSNR);

identifying patterns based on the correlation model;

selecting one of the four wavelength channels as a primary wavelength channel;

predicting the type, length, or priority of the data to be received in a next data broadcast based on the identified patterns; and based upon the prediction, dropping one, two or three of the four wavelength channels beginning with the wavelength channel having the most latency.

2. A system for transporting data in an optical network comprising:

a first main span;

a second main span;

one or more first main span intermediate boxes;

a number of second main span intermediate boxes corresponding to the number of first main span intermediate boxes to configure corresponding pairs of intermediate boxes between the first and second main spans;

a transverse link between each pair of intermediate boxes;

a first source means for multiplexing two wavelength channels on the first main span;

a second source means for multiplexing two wavelength channels on the second main span, each of the four wavelength channels transporting the same data;

a means for transmitting the same data on four wavelength channels on the first and second main spans, the means for transmitting connected to the first and second source means for multiplexing;

at each corresponding pair of intermediate boxes:

a first means for selecting one wavelength channel from the two wavelength channels on the first main span and routing the selected wavelength channel on the transverse link; and a second means for selecting one wavelength channel from the two wavelength channels on the second main span and routing the selected wavelength channel on the transverse link, the first and second means for selecting configured to provide four diversely routed transmission pathways; and a first means for demultiplexing the two wavelength channels from the first main span;

a second means for demultiplexing the two wavelength channels from the second main span;

a controller connected to the first and second means for demultiplexing and configured to execute the steps comprising:

analyzing the data received in the four wavelength channels;

detecting information of known data patterns and events;

correlating the known data patterns and events using a correlation model, wherein the data pattern and event information comprises type of data, priority, size, origin, transmission delay, transmission wavelength and optical signal-to-noise ratio (OSNR);

identifying patterns based on the correlation model; and selecting one of the four wavelength channels as a primary wavelength channel; and the controller configured to predict the type, length, or priority of the data to be received in a next data broadcast based on the identified patterns, and based upon the prediction, drops one, two or three of the four received wavelength channels beginning with the received wavelength channel experiencing the most latency.

\* \* \* \* \*